US008670371B2

(12) United States Patent
Wentink

(10) Patent No.: US 8,670,371 B2
(45) Date of Patent: Mar. 11, 2014

(54) SYSTEMS AND METHODS FOR INDICATING BUFFERED DATA AT AN ACCESS POINT USING AN EMBEDDED TRAFFIC INDICATION MAP

(75) Inventor: Maarten Menzo Wentink, Utrecht (NL)

(73) Assignee: Conexant Systems, Inc., Irvine, CA (US)

( * ) Notice: Subject to any disclaimer, the term of this patent is extended or adjusted under 35 U.S.C. 154(b) by 0 days.

(21) Appl. No.: 13/535,212

(22) Filed: Jun. 27, 2012

(65) Prior Publication Data

US 2012/0263094 A1 Oct. 18, 2012

Related U.S. Application Data

(63) Continuation of application No. 12/047,210, filed on Mar. 12, 2008, now Pat. No. 8,233,414.

(60) Provisional application No. 60/948,047, filed on Jul. 5, 2007.

(51) Int. Cl.
H04B 7/14 (2006.01)

(52) U.S. Cl.
USPC .......................................... 370/315

(58) Field of Classification Search
USPC ............ 370/310, 315–318; 455/7, 11.1, 12.1, 455/13.4
See application file for complete search history.

(56) References Cited

U.S. PATENT DOCUMENTS

| 6,879,567 | B2* | 4/2005 | Callaway et al. | 370/311 |
|---|---|---|---|---|
| 7,283,563 | B1* | 10/2007 | Allan | 370/469 |
| 7,613,109 | B2* | 11/2009 | Jha et al. | 370/230 |
| 7,864,720 | B2* | 1/2011 | Jeyaseelan | 370/311 |
| 8,005,032 | B2* | 8/2011 | Wang et al. | 370/311 |
| 2004/0100898 | A1* | 5/2004 | Anim-Appiah et al. | 370/210 |
| 2004/0257986 | A1* | 12/2004 | Jha et al. | 370/229 |
| 2005/0009512 | A1* | 1/2005 | Rue | 455/420 |
| 2007/0014269 | A1* | 1/2007 | Sherman et al. | 370/338 |
| 2008/0225768 | A1* | 9/2008 | Wentink | 370/311 |
| 2009/0238133 | A1* | 9/2009 | Sakoda | 370/329 |
| 2009/0274082 | A1* | 11/2009 | Wentink | 370/311 |
| 2010/0296495 | A1* | 11/2010 | Iino et al. | 370/338 |

* cited by examiner

Primary Examiner — Fan Ng
(74) Attorney, Agent, or Firm — Farjami & Farjami LLP

(57) ABSTRACT

Stations in standby mode periodically wake up to check for buffered data at the access points. Traditionally, the information is available by checking the periodic beacon frame for a traffic indication map (TIM). Unfortunately, the length of beacons has steadily increased with the progression of the various wireless standards requiring stations to wake up for longer periods to merely check for buffered data. Several approaches are disclosed which address this shortcoming, including the broadcast of TIM frames, the partial reception of beacon frames and the use of an embedded TIM frame within a beacon frame.

23 Claims, 16 Drawing Sheets

| Order | Information | Notes |
|---|---|---|
| 1 | Timestamp | |
| 2 | Beacon Interval | |
| 3 | Capability | |
| 4 | Service Set Identifier (SSID) | |
| 5 | Supported rates | |
| 6 | Frequency-Hopping (FH) Parameter Set | The FH Parameter Set information element is present within Beacon frames generated by STAs using frequency-hopping PHYs. |
| 7 | DS Parameter Set | The DS Parameter Set information element is present within Beacon frames generated by STAs using Clause 15, Clause 18, and Clause 19 PHYs. |
| 8 | CF Parameter Set | The CF Parameter Set information element is only present within Beacon frames generated by APs supporting a point coordination function (PCF). |
| 9 | IBSS Parameter Set | The IBSS Parameter Set information element is only present within Beacon frames generated by STAs in an IBSS. |
| 10 | Traffic indication map (TIM) | The TIM information element is only present within Beacon frames generated by APs. |
| 11 | Country | The Country information element shall be present when dot11MultiDomainCapabilityEnabled is true or dot11SpectrumManagementRequired is true |

FIG. 6

NO. OF OCTETS PER FIELD

| 1 | 1 | 1 | 1 | 1 | 1-251 |
|---|---|---|---|---|---|
| 702 Element ID | 704 Length | 706 DTIM Count | 708 DTIM Period | 710 Bitmap Control | 712 Partial Virtual Bitmap |

FIG. 7

NO. OF OCTETS PER FIELD

| 2 | 2 | 6 | 6-257 | 4 |
|---|---|---|---|---|
| 802 Frame Control | 804 Duration/ID | 806 A1 (BC) | 808 TIM | 810 FCS |

| 702 Element ID | 704 Length | 710 Bitmap Control | 712 Partial Virtual Bitmap |
|---|---|---|---|
| 1 | 1 | 1 | 1-251 |

NO. OF OCTETS PER FIELD

FIG. 10

| 702 Element ID | 704 Length | 1010 Bitmap Control | 1012 Partial Virtual Bitmap | 1014 Bitmap Control | 1016 Partial Virtual Bitmap |
|---|---|---|---|---|---|
| 1 | 1 | 1 | 1-251 | 1 | 1-251 |
| | | { TIM } | | { TIM } | |

NO. OF OCTETS PER FIELD

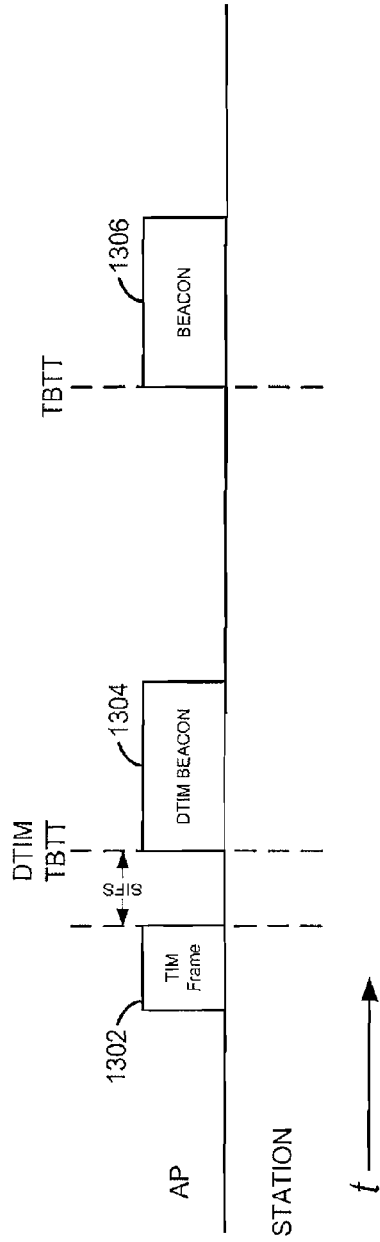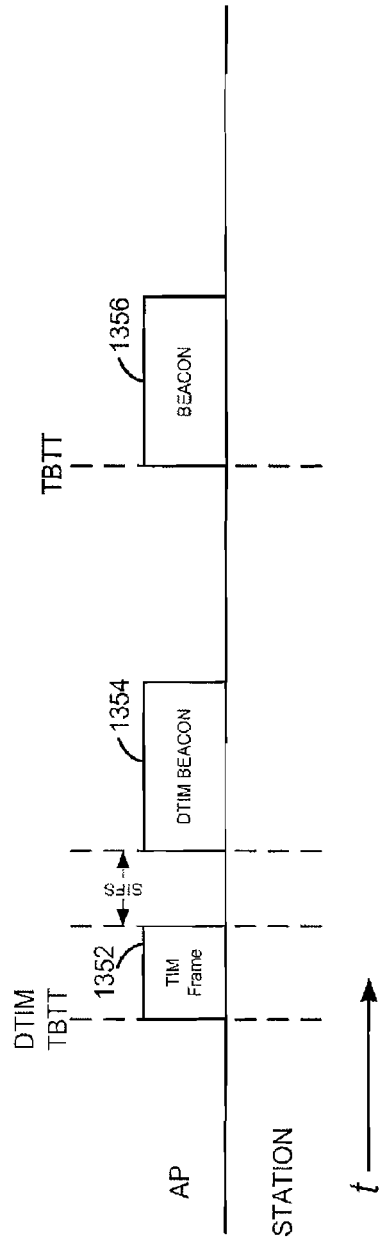
FIG. 13A
FIG. 13B

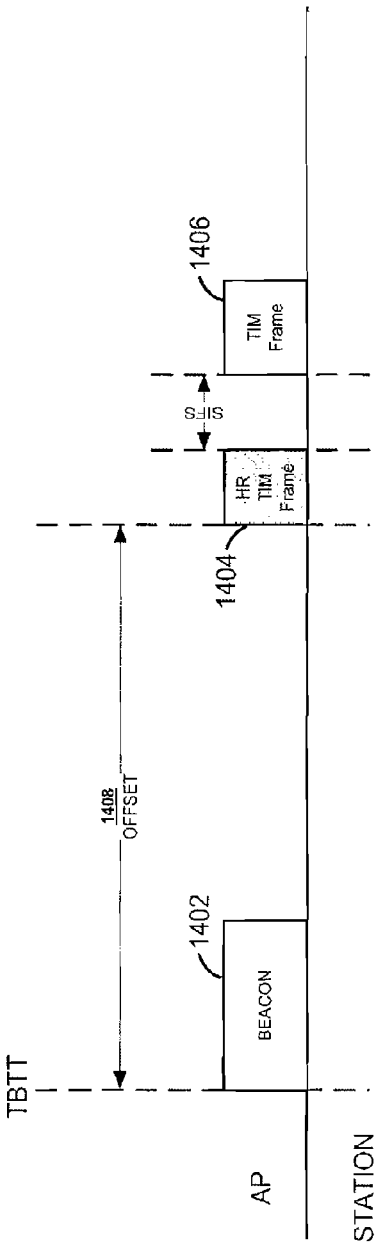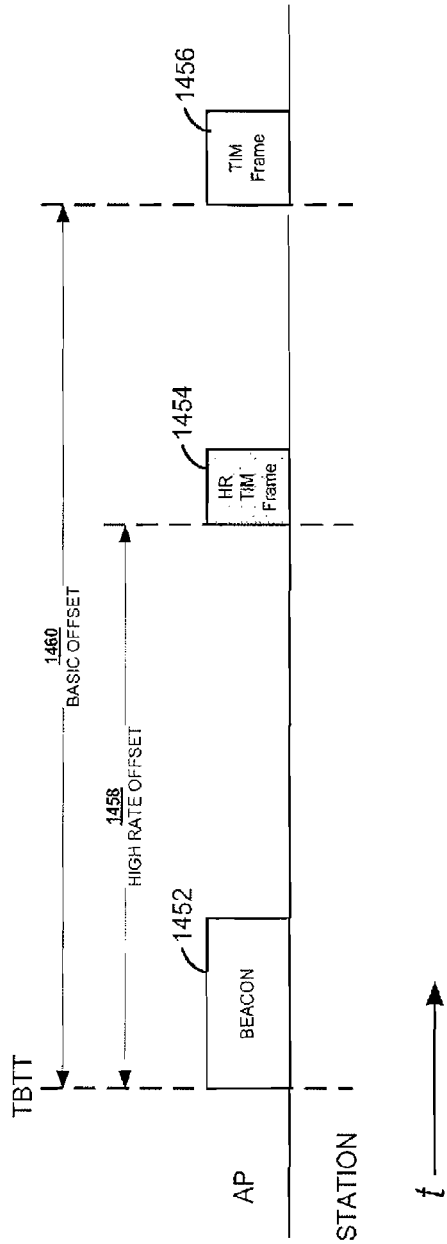

FIG. 16

| 1602 Frame Control | 1604 Duration/ID | 1606 A1 (BC) | 1608 Check Beacon | 1608 TIM | 1610 FCS |
|---|---|---|---|---|---|
| 2 | 2 | 6 | 1 | 6-257 | 4 |

NO. OF OCTETS PER FIELD

FIG. 17

| 1702 Frame Control | 1704 Duration/ID | 1706 A1 (BC) | 1708 A2 (BSSID) | 1710 A3 (BSSID) | 1712 SC | 1714 Category | 1716 Action | 1718 Check Beacon | 1720 TIM | 1722 FCS |
|---|---|---|---|---|---|---|---|---|---|---|
| 2 | 2 | 6 | 6 | 6 | 6 | 1 | 1 | 1 | 6-257 | 4 |

NO. OF OCTETS PER FIELD

FIG. 19

| 1902 Frame Control | 1904 Duration/ID | 1906 A1 (BC) | 1908 A2 (BSSID) | 1910 A3 (BSSID) | 1912 SC | 1914 Timestamp | 1916 Beacon Interval | 1918 Capability | 1920 Check Beacon | 1922 TIM |
|---|---|---|---|---|---|---|---|---|---|---|
| 2 | 2 | 6 | 6 | 6 | 2 | 8 | 2 | 2 | 3 | 6-257 |

NO. OF OCTETS PER FIELD

FIG. 20

| 2002 Element ID | 2004 Length (1) | 2006 Check Beacon |
|---|---|---|
| 1 | 1 | 1 |

NO. OF OCTETS PER FIELD

FIG. 21

| 2102 Element ID | 2104 Length (1) | 2106 Error Detection |
|---|---|---|
| 1 | 1 | 1 |

NO. OF OCTETS PER FIELD

FIG. 22

NO. OF OCTETS PER FIELD

| 2 | 2 | 6 | 6 | 6 | 2 | 8 | 2 | 2 | 6-257 |
|---|---|---|---|---|---|---|---|---|---|
| 2202 Frame Control | 2204 Duration/ID | 2206 A1 (BC) | 2208 A2 (BSSID) | 2210 A3 (BSSID) | 2212 SC | 2214 Timestamp | 2216 Beacon Interval | 2218 Capability | 2220 ETIM |

FIG. 23

NO. OF OCTETS PER FIELD

| 1 | 1 | 1 | 1 | 1-251 | 1 |
|---|---|---|---|---|---|
| 2302 Element ID | 2304 Length | 2306 Check Beacon | 2308 Bitmap Control | 2310 Partial Virtual Bitmap | 2312 Error Detection |

# SYSTEMS AND METHODS FOR INDICATING BUFFERED DATA AT AN ACCESS POINT USING AN EMBEDDED TRAFFIC INDICATION MAP

CROSS-REFERENCE TO RELATED APPLICATION

The present application is a continuation of U.S. application Ser. No. 12/047,210, filed Mar. 12, 2008, which claims priority to, and the benefit of U.S. Provisional Patent Application entitled, "Embedded Traffic Indication Map," having Ser. No. 60/948,047, filed on Jul. 5, 2007, which is incorporated by reference in its entirety.

This application is also related to U.S. patent application entitled, "Systems and Methods for Indicating Buffered Data at an Access Point Using a Traffic Indication Map Broadcast", having Ser. No. 12/046,946, filed on Mar. 12, 2008, which claims priority to U.S. Provisional Patent Application entitled, "TIM Broadcast," having Ser. No. 60/906,608, filed on Mar. 13, 2007 and to U.S. Provisional Patent Application entitled, "Check Beacon Indication," having Ser. No. 60/970,195, filed on Sep. 5, 2007, which is incorporated by reference in its entirety.

This application is also related to U.S. patent application entitled, "Systems and Methods for Indicating Buffered Data at an Access Point with Efficient Beacon Handling", having Ser. No. 12/047,021, filed on Mar. 12, 2008, which claims priority to U.S. Provisional Patent Application entitled, "Partial Beacon Reception," having Ser. No. 60/932,791, filed on May 31, 2007, which is also incorporated by reference in its entirety.

BACKGROUND OF THE INVENTION

1. Field of the Invention

The present disclosure generally relates to wireless communications and more particularly relates to systems and methods for retrieving buffered data from an access point.

2. Background Information

Among other things, FIG. 1 illustrates a typical network configuration for communicating data between stations via an access point in a wireless local area network (WLAN) or 802.11-based network. As illustrated in the non-limiting example of FIG. 1, a network 140 may be coupled to access point 130. In some embodiments, the network 140 may be the Internet, for example. Access point 130 can be configured to provide wireless communications to various wireless devices or stations 110, 120, 124. Depending on the particular configuration, the stations 110, 120, 124 may be a personal computer (PC), a laptop computer, a mobile phone, a personal digital assistant (PDA), and/or other device configured for wirelessly sending and/or receiving data. Furthermore, access point 130 may be configured to provide a variety of wireless communications services, including but not limited to: Wireless Fidelity (WIFI) services, Worldwide Interoperability for Microwave Access (WiMAX) services, and wireless session initiation protocol (SIP) services. Furthermore, the stations 110, 120, 124 may be configured for WIFI communications (including, but not limited to 802.11, 802.11b, 802.11a/b, 802.11g, and/or 802.11n).

Access point 130 periodically broadcasts a beacon frame to various stations at a beacon period. The beacon frame is used by an access point to announce its presence and to relay information. For example, if station 110 is a laptop and is powered up or is transported to a location within range of access point 130, station 110 listens for a beacon frame from all access points in its range. Each access point within range transmits a beacon frame and depending on the system, the user at station 110 can select which access point to use, thereby making an association between station 110 and the access point.

In order to save power, stations can be put into standby mode. While sleeping, the access point buffers data intended for the station. Also, for the purposes of this disclosure the term "sleep mode" will be taken to mean an operating state entered by a computing device either upon initiation by a user or after expiration of a period of sufficient inactivity in which the amount of power supplied to the device is reduced as compared to the amount supplied during normal operation. The stations in standby mode wake up to receive the beacon frame. Contained within the beacon frame is a traffic indication map (TIM) element which indicates for which stations the access point has buffered data waiting. If the station has determined that the access point has buffered data for it, the station can retrieve the data by sending a Power Saving-POLL (PS-Poll) frame.

FIG. 2 shows an example of the retrieval of buffered data by the station using a PS-Poll frame. In sequence 200, PS-Poll frame 202 sent by the station is followed immediately after a short interframe space (SIFS) by the data frame 206 sent by the access point. After another SIFS, the station responds with acknowledgement (ACK) 210.

As illustrated in FIG. 3, the stations in standby mode wake up at the target beacon transmission time (TBTT) in order to receive the beacon frame. After a beacon frame is received, the station can determine the TBTT for the next beacon frame from the start time of the current beacon frame and the beacon interval value transmitted in the current beacon frame. In the timeline shown here, beacon frames 302, 304, 306, 308, and 310 represent five beacon frames transmitted by the access point. The frequency of the beacon frames is represented by the period equal to the beacon interval. Each of the beacon frames in the example contains a TIM element; specifically, beacon frames 302, 304, 306, and 310 contain TIM elements 312, 314, 316, 318 and 320, respectively. Periodically, the TIM element in the beacon frame is a delivery traffic indication map (DTIM), which indicates after the beacon frame the access point will transmit buffered multicast or broadcast data.

Stations in standby mode, in addition to determining whether the access point has any buffered data waiting for it, may also require additional information from the beacon frame. For example, the access point may announce a channel switch through a channel switch announcement information element which can be included in a beacon frame or some other announcement mechanism such as a probe response as described below. The channel switch announcement information element indicates that the Basic Service Set (BSS) will move to another channel shortly. This information is needed by the station so that it can follow the channel change; otherwise, it will wake only to find that the beacon frame no longer is transmitting on the present channel.

In order for any station in standby mode, which has been associated with an access point to determine whether that access point has buffered data waiting for that station, the station must periodically wake up to receive the TIM element within the beacon frame. However, the length of beacon frames has grown over time with the progression of standards and implementation of more and more features. This would require the station to stay awake longer to receive a lengthy beacon frame, which can cause a station to consume more power in standby mode. Furthermore, beacon frames are generally transmitted at a low physical layer (PHY) rate, often at the lowest PHY rate allowable. Because the transmission rate is so low, the station must stay awake longer to receive the beacon frame. This has an adverse effect on the battery life of handheld devices. Accordingly, various needs exist in the industry to address the aforementioned deficiencies and inadequacies.

SUMMARY OF INVENTION

In the past, TIMs have been used by access points to indicate to stations in standby mode that buffered traffic awaits it. The methods disclosed enable the reception of the TIM in a more efficient fashion by the stations. Further features enable the stations to selectively receive beacon frames which can unnecessarily increase the time a station in standby mode has to awaken.

An embedded TIM (ETIM) element can be included in a beacon frame near the beginning of the beacon frame, requiring the station to only receive part of the beacon frame to determine if buffered data is waiting. The ETIM element can also comprise multiple partial virtual bitmaps when the TIM is sparse. The ETIM element need not be included in every beacon frame and can be included in DTIM beacon frames. Additionally, the ETIM element includes a check beacon indication. The indication signifies whether a critical or significant change has taken place in the beacon frame. The indication can be implemented by incrementing representative counters when such changes take place. A station can then check the indication to decide whether to receive the remainder of the beacon.

Access points and stations comprising a processor, network interfaces and a memory can be configured to interoperate with the methods and variations described above by implementing additional logical modules as instructions in the memory. The logic can then be carried out by the processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 shows the first eleven fields in the basic format of a beacon frame as used in various wireless standards in a recommended order;

FIG. 7 shows a TIM element within a beacon frame as used in various wireless standards;

FIG. 8 shows a TIM control frame format;

FIG. 9 illustrates a modified TIM element for possible use in a TIM frame for broadcast;

FIG. 10 shows an embodiment of a TIM element having two partial virtual bitmaps;

FIG. 13A illustrates the timing where a TIM frame is transmitted prior to a DTIM TBTT;

FIG. 13B illustrates the timing where a TIM frame is transmitted at a DTIM TBTT;

FIG. 14A illustrates one timing for transmission of two TIM frames at different PHY rates;

FIG. 14B shows a timeline where both a high rate TIM frame and a low rate TIM frame are individually scheduled;

FIG. 16 illustrates a TIM control frame which includes check beacon field;

FIG. 17 illustrates the alternative embodiment of a TIM frame with a check beacon indication where the TIM frame is a management action frame;

FIG. 19 illustrates the first portion of a beacon frame in accordance to one embodiment of the invention;

FIG. 20 illustrates an exemplary embodiment of the check beacon informational element;

FIG. 21 illustrates a partial frame check informational element exemplary embodiment;

FIG. 22 shows an exemplary first portion of the beacon frame using an ETIM element; and FIG. 23 shows the format of an ETIM informational element.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
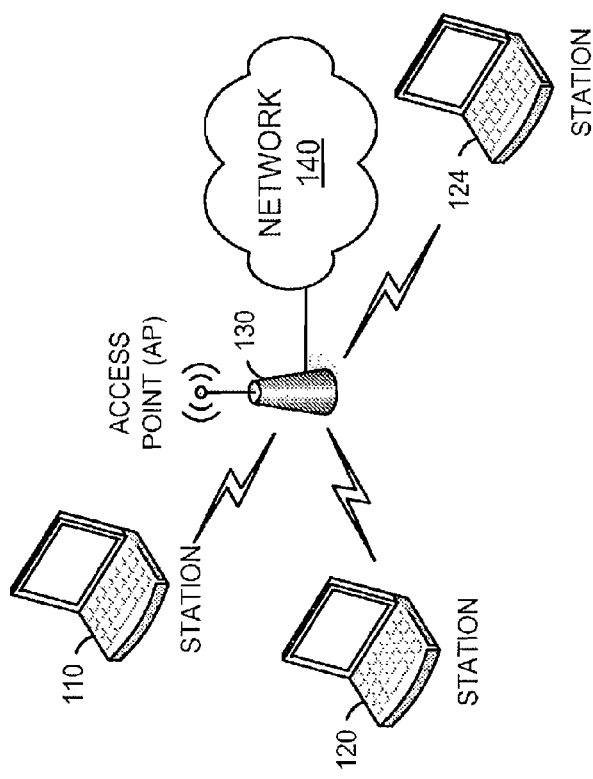
FIG. 1 illustrates a typical network configuration for communicating data between stations via an access point in a WLAN or 802.11-based network.
Figure 2:
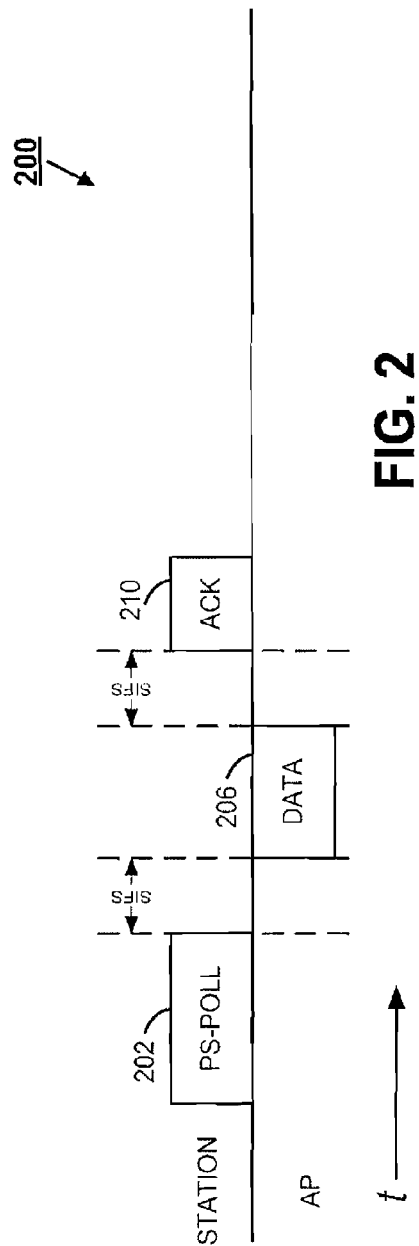
FIG. 2 shows an example of the retrieval of buffered data by the station using a PS-Poll frame.
Figure 3:
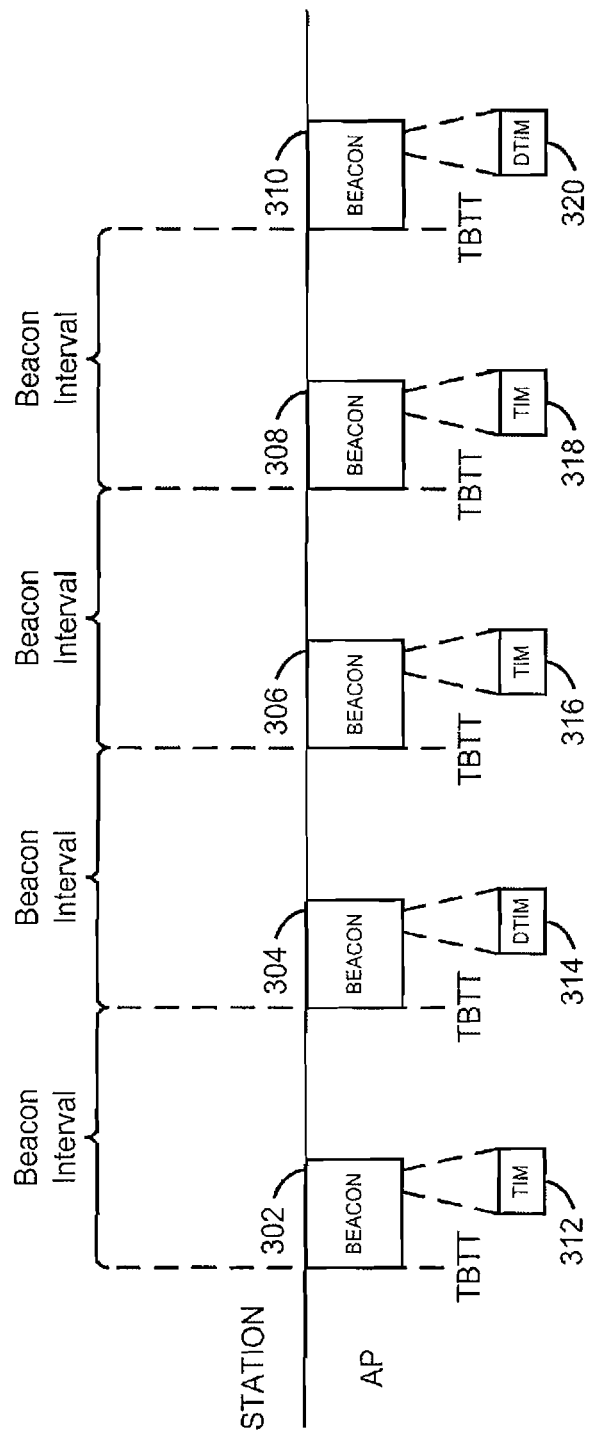
FIG. 3 illustrates the timing of stations in standby mode waking up at the TBTT in order to receive a beacon frame.
Figure 4:
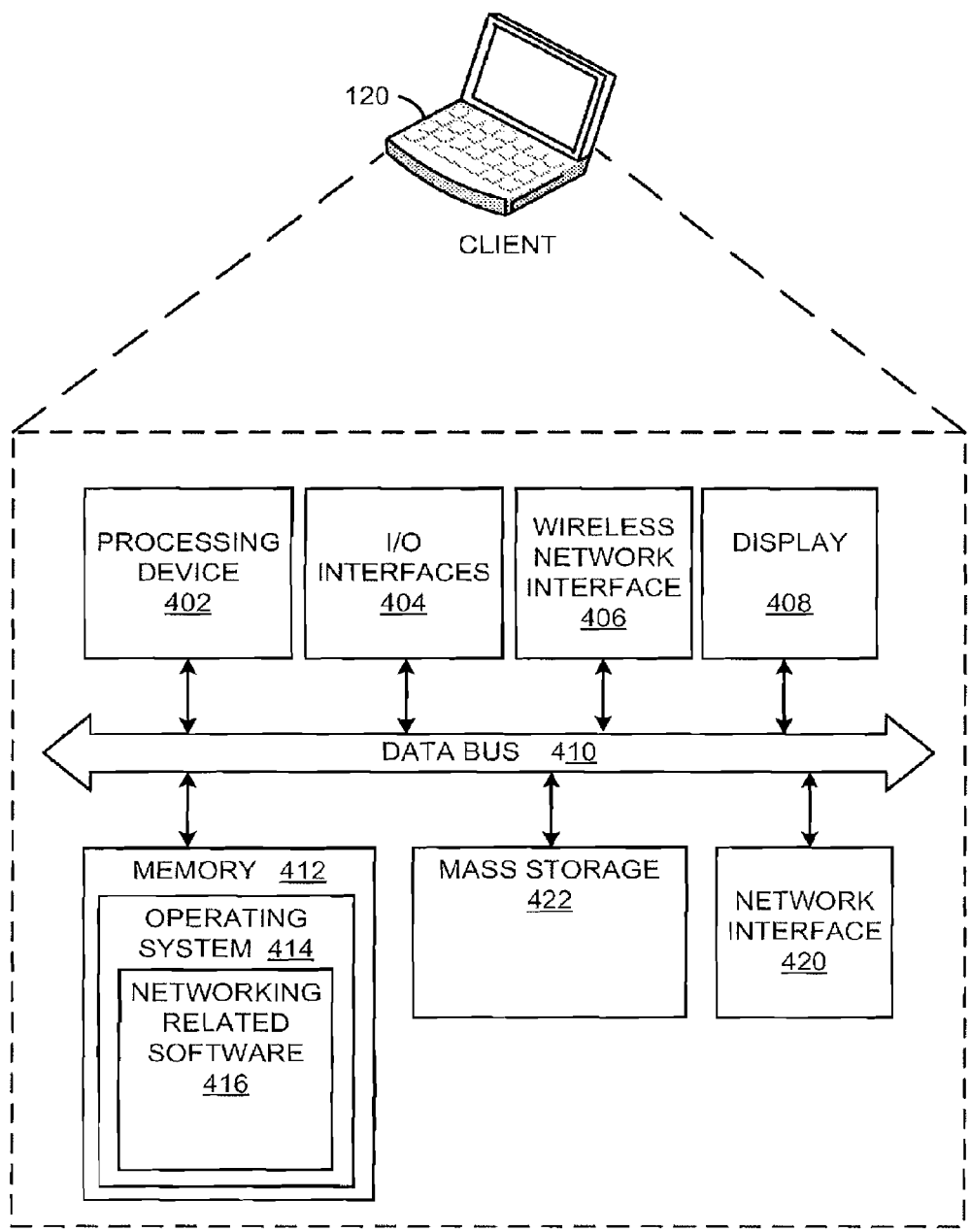
FIG. 4 illustrates an embodiment of one of the wireless devices/stations shown in FIG. 1.

FIG. 4 illustrates an embodiment of one of the wireless devices/stations shown in FIG. 1. It can be configured to receive and process messages as disclosed below. Generally speaking, station 120 can comprise any one of a wide variety of wireless computing devices, such as a desktop computer, portable computer, dedicated server computer, multiprocessor computing device, cellular telephone, PDA, handheld or pen based computer, embedded appliance and so forth. Irrespective of its specific arrangement, station 120 can, for instance, comprise memory 412, processing device 402, a number of input/output interfaces 404, wireless network interface device 406, display 408, and mass storage 422, wherein each of these devices is connected across one or more data buses 410. Optionally, station 120 can also comprise a network interface device 420, also connected across one or more data buses 410.

Processing device 402 can include any custom made or commercially available processor, a central processing unit (CPU) or an auxiliary processor among several processors associated with the computing device 120, a semiconductor based microprocessor (in the form of a microchip), a macroprocessor, one or more application specific integrated circuits (ASICs), a plurality of suitably configured digital logic gates, or generally any device for executing instructions.

Input/output interfaces 404 provide any number of interfaces for the input and output of data. For example, where station 120 comprises a PC, these components may interface with user input device 404, which may be a keyboard or a mouse. Where station 120 comprises a handheld device (e.g., PDA, mobile telephone), these components may interface with function keys or buttons, a touch sensitive screen, a stylist, etc. Display 408 can comprise a computer monitor or a plasma screen for a PC or a liquid crystal display (LCD) on a hand held device, for example.

Wireless network interface device 406 and, optionally, network interface device 420 comprise various components used to transmit and/or receive data over a network environment. By way of example, these may include a device that can communicate with both inputs and outputs, for instance, a modulator/demodulator (e.g., a modem), wireless (e.g., radio frequency (RF)) transceiver, a telephonic interface, a bridge, a router, network card, etc. Station 120 can use wireless network interface device 406 to communicate with access point 130.

With further reference to FIG. 4, memory 412 can include any one of a combination of volatile memory elements (e.g., random-access memory (RAM), such as DRAM, and SRAM, etc.) and nonvolatile memory elements (e.g., flash, read only memory (ROM), nonvolatile RAM, etc.). Mass storage 422 can also include nonvolatile memory elements (e.g., flash, hard drive, tape, CDROM, etc.). Memory 412 comprises software which may include one or more separate programs, each of which includes an ordered listing of executable instructions for implementing logical functions. Often, the executable code can be loaded from nonvolatile memory elements including from components of memory 412 and mass storage 422. Specifically, the software can include native operating system 414, one or more native applications, emulation systems, or emulated applications for any of a variety of operating systems and/or emulated hardware platforms, emulated operating systems, etc. These may further include networking related software 416 which can further comprise a communications protocol stack comprising a physical layer, a link layer, a network layer and a transport layer. Network related software 416 can be used by processing device 402 to communicate with access point 130 through wireless network interface 406 and can further include logic that causes the station to wake up at a proscribed time to receive one or more TIM frames, a TIM element or ETIM element, depending on the embodiment, to determine if access point 130 has buffered data for it. The software can further include logic which retrieves the buffered data using a PS-Poll message if there is buffered data and checks the check beacon indication within the received TIM frames, beacon frame or ETIM element, depending on the embodiment, to decide whether to receive the entire beacon frame. In particular, the software can receive a wakeup instruction from the access point even in a protected wireless network. It should be noted, however, that the logic for performing these processes can also be implemented in hardware or a combination of software and hardware. One of ordinary skill in the art will appreciate that the memory 412 can, and typically will, comprise other components which have been omitted for purposes of brevity.

Figure 5:
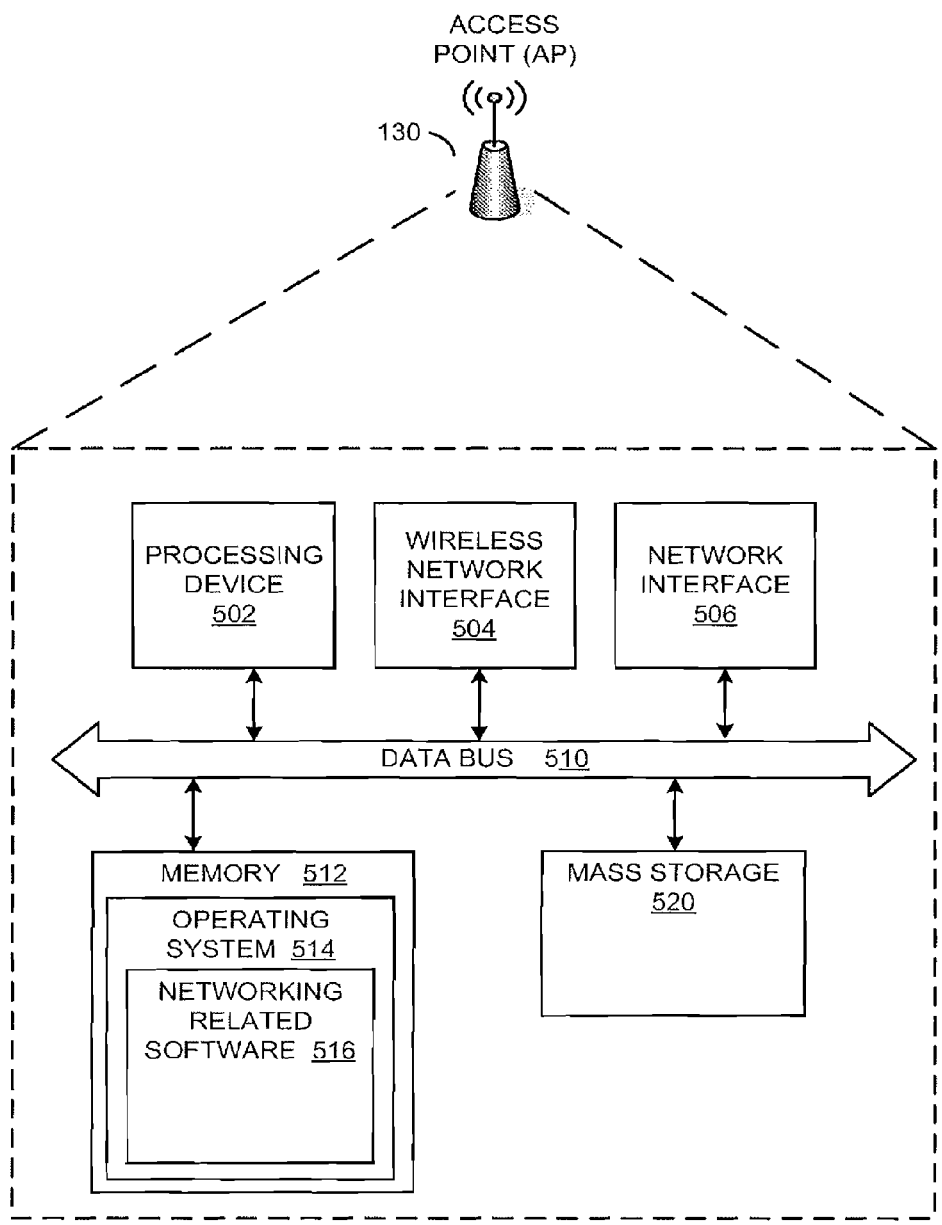
FIG. 5 illustrates an embodiment of an access point shown in FIG. 1.

FIG. 5 illustrates an embodiment of an access point shown in FIG. 1. It can be configured to receive and process messages as disclosed below. Generally speaking, station 120 can comprise any one of a wide variety of network functions, including network address translation (NAT), routing, dynamic host configuration protocol (DHCP), domain name services (DNS) and firewall functions. Irrespective of its specific arrangement, the stations 120 can, for instance, comprise memory 512, a processing device 502, wireless network interface 504, network interface 506, and nonvolatile storage 524, wherein each of these devices is connected across one or more data buses 510.

Processing device 502 can include any custom made or commercially available processor, a CPU or an auxiliary processor among several processors associated with access point 130, a semiconductor based microprocessor (in the form of a microchip), a macroprocessor, one or more ASICs, a plurality of suitably configured digital logic gates, or generally any device for executing instructions.

Wireless network interface device 504 and network interface device 506 comprise various components used to transmit and/or receive data over a network environment. By way of example, either interface may include a device that can communicate with both inputs and outputs, for instance, a modulator/demodulator (e.g., a modem), wireless (e.g., RF) transceiver, a telephonic interface, a bridge, a router, network card, etc.). Access point 130 typically uses wireless network interface device 504 to communicate with nearby stations, and network interface device 506 to communicate with network 140. In some implementation, the two devices can be combined into one physical unit.

With further reference to FIG. 5, memory 512 can include any one of a combination of volatile memory elements (e.g., RAM, such as DRAM, and SRAM, etc.) and nonvolatile memory elements (e.g., flash, ROM, nonvolatile RAM, hard drive, tape, CDROM, etc.). Memory 512 comprises software which may include one or more separate programs, each of which includes an ordered listing of executable instructions for implementing logical functions. Often, the executable code and persistent configuration parameters can be loaded from nonvolatile memory elements including from components of memory 512. Specifically, the software can include native operating system 514, one or more native applications, emulation systems, or emulated applications for any of a variety of operating systems and/or emulated hardware platforms, emulated operating systems, etc. These may further include networking related software 522 which can further comprise a communications protocol stack comprising a physical layer, a link layer, a network layer and a transport layer. These may further include networking related software 516 which can further comprise a communications protocol stack comprising a physical layer, a link layer, a network layer and a transport layer. Network related software 516 can be used by processing device 502 to communicate with access point 130 through wireless network interface 506 and can further include logic that causes the access point to broadcast one or more TIM frames, which can include a check beacon indication, at a proscribed time. Alternatively, the software can include logic that causes the access point to transmit a beacon frame with the TIM element placed near the beginning of the beacon frame and include a check beacon indication. The software can include logic that causes the access point to transmit a beacon frame with an ETIM element placed near the beginning of the beacon frame. In particular, the software can receive a wakeup instruction from the access point even in a protected wireless network. It should be noted, however, that the logic for performing these processes can also be implemented in hardware or a combination of software and hardware. One of ordinary skill in the art will appreciate that the memory 512 can, and typically will, comprise other components which have been omitted for purposes of brevity.

FIG. 6 shows the first eleven fields in the basic format of a beacon frame as used in various wireless standards in a recommended order. First is the timestamp field comprising the time the present frame is sent. Following that is the beacon interval field which represents the number of time units between TBTTs, followed by the capability information field containing a number of subfields that are used to indicate requested or advertised capabilities. It should be noted that the first three fields are fixed length fields.

The remaining fields are information elements. The first of these in the recommended order is the service set identity (SSID) element which indicates the identity of an extended service set (ESS) or independent basic service set (IBSS). The supported rates element specifies the communications rates that are supported in accordance with a specific standard. The frequency-hopping (FH) Parameter Set element contains the set of parameters necessary to allow synchronization for stations using a FH physical layer and is only present when FH physical layers are used. Direct sequence (DS) parameter set element contains information to allow channel number identification for stations using a direct sequence spread spectrum (DSSS) physical layer. The coordination function (CF) parameter set element contains the set of parameters necessary to support the point coordination function (PCF). The IBSS Parameter Set element contains the set of parameters necessary to support an IBSS (e.g., an ad hoc network). This is followed by the TIM element which is described in further detail below. Country element indicates which country the access point is in. Further detailed description of any of these fields is given in their individual standards.

FIG. 7 shows a TIM element within a beacon frame as used in various wireless standards. The first octet is field 702 which contains the element ID, a unique code used to identify the type of element in accordance with the given wireless standard. For example, in 802.11, the element ID, 5, is assigned to the TIM element. The second octet is length field 704 indicating length in octets of the remaining fields in the element. The remaining fields are sometimes referred to as the information field. The next octet is DTIM count field 706 indicating how many beacon frames, including the current beacon frame before the next DTIM. The next octet is DTIM period field 708 indicating the number of beacon periods between DTIM. The next octet is bitmap control field 710 comprising a plurality of bits indicative of various features of the bitmap to follow, including the offset into the bitmap. Partial virtual bitmap field 712 comprises 1 to 251 octets. Each bit in partial virtual bitmap 712 refers to a single station through a mapping of association identifiers (AIDs) to bits in partial virtual bitmap 712, where the mapping is specified by the individual standard. The value of the bit is indicative of whether the associated station has buffered data waiting.

Rather than require a station in standby to wake up to receive a complete beacon frame to determine if the access point has buffered data for the station, a TIM frame containing the same information as the TIM element within the beacon frame can be broadcast at a proscribed time. Any station in standby mode associated with the access point can wake up to receive the TIM frame broadcast to determine whether there is any buffered data waiting for it. Since the TIM frame is much shorter than the beacon frame, the station will be awake for a much shorter time and hence consume less power. The TIM frame is shorter because it contains less octets than a typical beacon, but also because it may be transmitted at a higher rate than the beacon. A TIM element could be incorporated into either a control frame or a management action frame, to form a TIM frame.

FIG. 8 shows a TIM control frame format. Frame control field 802 is a two octet fixed field indicative of properties of the frame as defined by the particular standard. Duration/ID field 804 is a two octet fixed field which comprises either duration information or identification information depending on the frame use as defined by the particular standard. Receiver address field 806 is a six octet fixed field which comprises an address indicative of the receiving station, but since this is a broadcast, the special broadcast address as specified by the particular standard is used here. Following receiver address field 806 is TIM element 808 which can vary from 6 to 257 octets. Finally, frame check sequence field 810 is a four octet fixed field indicative of the integrity of the frame. The specific integrity check is specified by the standard, but as an example, some standards use a cyclic redundancy code (CRC).

TIM element 808 can use the same format as TIM element described in FIG. 7 However, DTIM count field 706 and DTIM period field 708 are not meaningful unless the TIM element is in a beacon frame. Therefore, a modified TIM element as described below in FIG. 9 can also be used.

FIG. 9 illustrates a modified TIM element for possible use in a TIM frame for broadcast. The format for the modified TIM element is identical to the format shown in FIG. 9 except DTIM count field 706 and DTIM period field 708 have been removed. If the TIM element of FIG. 9 is used, then the number of octets the TIM element occupies can range from 4 to 255 rather than from 6 to 257.

Partial virtual bitmap 712 may become unnecessarily long, especially if the number of stations having buffered data is relatively small making the partial virtual bitmap sparse. In an extreme example, suppose buffered data is awaiting two stations with AID 1 and AID 1001. In order to indicate this, partial virtual bitmap 712 would have to be 126 octets in length.

FIG. 10 shows an embodiment of a TIM element having two partial virtual bitmaps. Rather than have one partial virtual bitmap of 251 octets, two shorter partial virtual bitmaps could be used. Using the extreme example given above, traffic for the station with AID 1 would be represented with a zero offset reflected in bitmap control 1010. Partial virtual bitmap 1012 would only need to be one octet wide. Traffic indication for the station with AID 1001 would then be represented in the second set of TIM fields by a bitmap control 1014 which would indicate an offset of 125 octets and partial virtual bitmap 1016 which would only need to be one octet wide. A total of four octets would be used compared to 126. Clearly, this process could be repeated for more than two sets of TIM fields, when the stations with buffer data is sparse.

Figure 11:
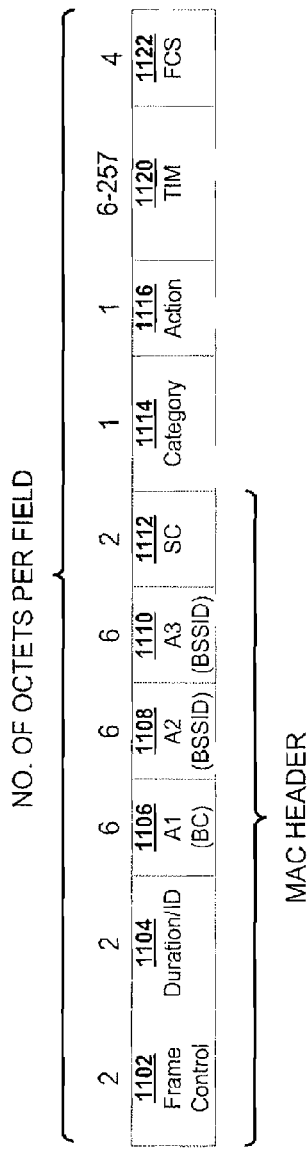
FIG. 11 shows a TIM management action frame format.

FIG. 11 shows a TIM management action frame format. Fields 1102, 1104, 1106, 1108, 1110 and 1112 are often collectively referred to as the media access control (MAC) header. More specifically, frame control field 1102 is similar to frame control field 802 in FIG. 8, in this case indicating that the frame is an action frame. Duration/ID field 1104 is similar to Duration/ID field 804 in FIG. 8. Destination address field 1106 is similar to receiver address field 806 and should be set to the special broadcast address as specified by the particular standard. Source address field 1108 is a six octet fixed field, which is indicative of the source in this case, is set to the basic service set identification (BSSID) because the source is the access point which has the BSSID as its MAC address. Address field 1110 is a six octet fixed field which is indicative of the BSSID. Sequence control field 1112 is a two octet fixed field which comprises a fragment number and a sequence number. The fragment number is used when a frame is fragmented to keep track of the fragments. The sequence number is incremented each time a station transmits a message. Category field 1114 is a one octet field indicative of the category of action in a management action frame. In this case, a TIM action frame would fall under the category of Wireless Network Management. Action field 1116 is a one octet field indicative of the specific action within the category. In this case, the action is a TIM frame. TIM element 1120 is similar to the TIM elements described above. It can be the 6 to 257 octet TIM element of FIG. 7 or the 4 to 255 octet TIM element of FIG. 9. Finally, frame check sequence field 1122, like frame check sequence 810 is a four octet fixed field indicative of the integrity of the frame.

While a TIM control frame as depicted in FIG. 8 is shorter and would require a station to awaken for a shorter period of time, control frames typically are implemented at a lower level and often would require a change in hardware to support it. In contrast, management frames and in particular management action frames are intended to be extensible and the number of actions tends to grow as standards evolve. Therefore, a TIM management action frame is easier to implement than a TIM control frame.

Figure 12A:
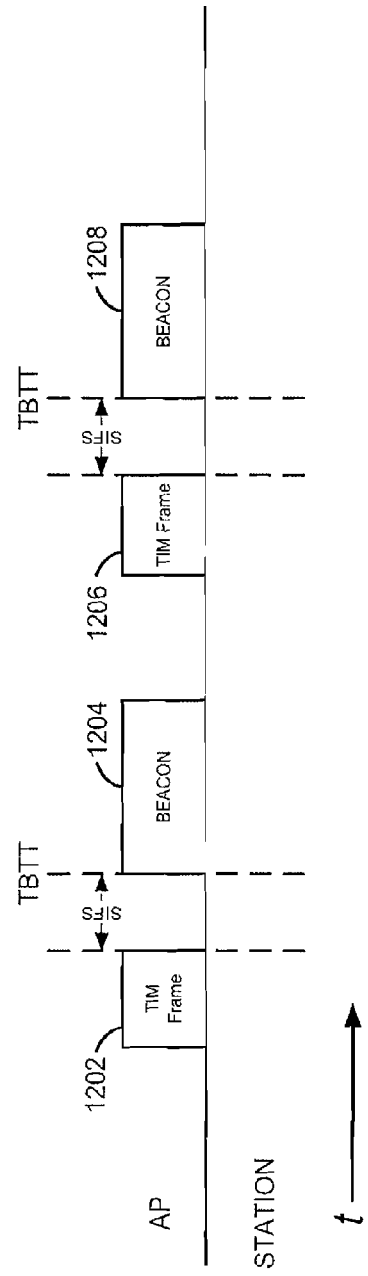
FIG. 12A illustrates the timing where a TIM frame is transmitted prior to a TBTT.
Figure 12B:
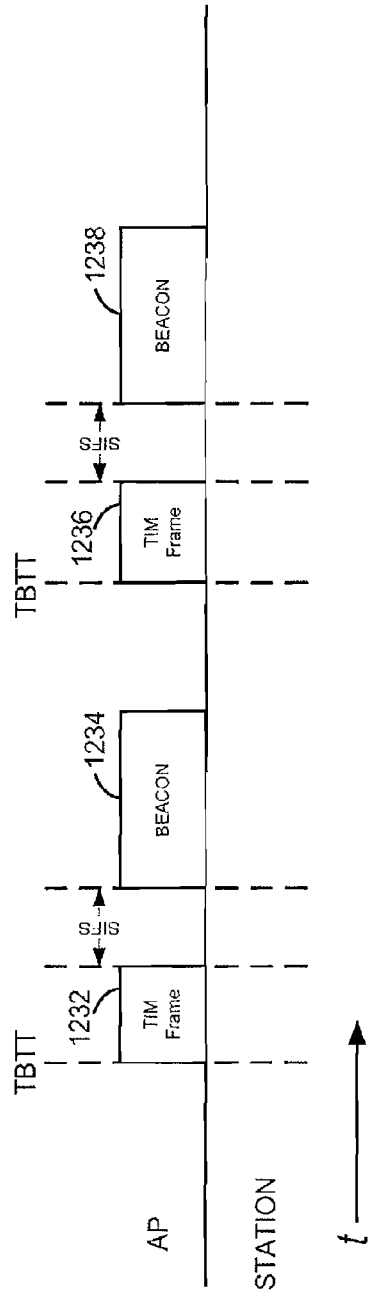
FIG. 12B illustrates the timing where a TIM frame is transmitted at a TBTT.
Figure 12C:
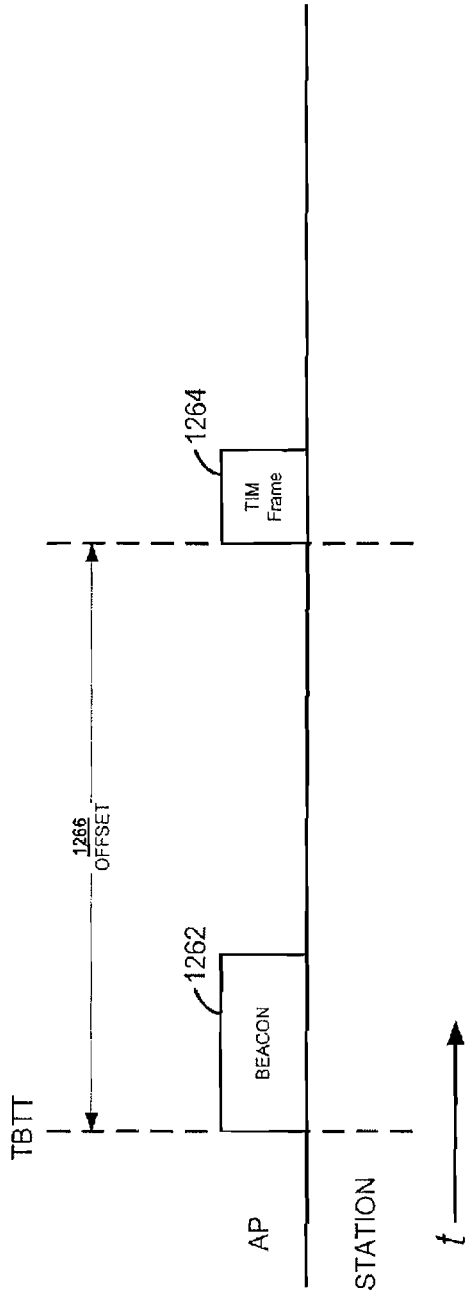
FIG. 12C illustrates the timing where a TIM frame is transmitted at a predetermined offset relative to a TBTT.

Timing of a TIM frame is critical as a station in standby mode must know when to wake up to look for the TIM frame. FIGS. 12A-C illustrate some exemplary timing schemes. As illustrated in FIG. 12A, in the first scheme, TIM frames 1202 and 1206 are transmitted at a time which is equal to the estimated length of the TIM frame with a SIFS prior to the TBTT. Beacons 1204 and 1208 are transmitted at their respective TBTTs. The estimated length used could be the maximum possible length of the TIM which can range from 269 to 285 octets depending on the form of the TIM frame used. The estimated length could also be based on the minimum length, or the average length of the TIM frame. Stations in standby mode that are aware of this TIM frame would then wake up at this time to receive the TIM frame. The access point can announce the presence of separate periodically sent TIM frames in several ways as available in the specific standard used. For example, an announcement element can be included in a beacon frame. Stations can also inquire as to properties of an access point by transmitting a probe request frame. In response to a probe request, an access point transmits a probe response which comprises many of the same parameter sets and informational elements as is present in the beacon frame. The announcement element described above can also be included in such a probe response.

FIG. 12B illustrates an alternate timing, where TIM frames 1232 and 1236 are transmitted at the TBTT. In this example, beacon frames 1234 and 1238 are postponed until after the transmission of TIM frames 1232 and 1236, respectively, followed by a respective SIFS. Stations searching for a beacon frame would then have to wait the length of the TIM frame followed by the SIFS to receive the beacon frame. A hybrid approach to FIG. 12A and FIG. 12B can also be implemented where the TIM frame is transmitted prior to the TBTT but not as early as described in FIG. 12A, so that the beacon frame is still postponed past the TBTT but by a time interval shorter than described in FIG. 12B. The interval prior to the TBTT could be announced through an announcement element in a beacon frame and/or probe response, so that a station in standby mode is aware of when to wake up to receive the TIM frame.

FIG. 12C illustrates a more general timing, where the TIM frame is transmitted any time between beacon frames. In this example, the transmission of TIM frame 1264 follows the TBTT of beacon frame 1262 by time offset 1266. The time offset from the TBTT for a TIM frame can be announced through an announcement element in a beacon frame and/or probe response, so that a station in standby mode is aware of when to wake up to receive the TIM frame. For example, the announcement element could comprise a fixed field indicating the number of microseconds after a TBTT that a TIM frame will be transmitted. The offset could be negative, which indicates that the TIM frame is transmitted before the TBTT.

It is not necessary to transmit a TIM frame every beacon interval. Even if there is no buffered data awaiting a station, a station in standby mode wakes up every DTIM beacon frame to receive buffered multicast data. As described above a DTIM beacon frame occurs once every DTIM period. Therefore, a TIM frame could be broadcast relative to a DTIM TBTT, which is a TBTT associated with a DTIM beacon frame. As a result, TIM frames are transmitted less frequently, and a station in standby mode need not wake up as frequently, hence saving power.

FIG. 13A illustrates the timing where a TIM frame is transmitted prior to a DTIM TBTT similar to the example shown in FIG. 12A, except that a TIM frame is transmitted immediately prior to only the DTIM TBTT and not other TBTTs. Again, the timing specifics can be announced through an announcement element in a beacon frame and/or probe response. Specifically referring to FIG. 13A, TIM frame 1302 is sent prior to DTIM beacon frame 1304, but no TIM frame proceeds regular beacon frame 1306.

FIG. 13B illustrates the timing where a TIM frame is transmitted at a DTIM TBTT similar to the example shown in FIG. 12B. The TIM frame is transmitted only at the DTIM TBTT and not other TBTTs. As a result the DTIM beacon frames are postponed until after the TIM frame is transmitted. However, all other beacon frames are transmitted at their respective TBTTs. Specifically as illustrated, TIM frame 1352 is transmitted at the DTIM TBTT causing DTIM beacon frame 1354 to be delayed until after TIM frame 1352 and an SIFS. However, regular beacon frame 1356 is transmitted at the TBTT. Like above, a hybrid approach to FIGS. 13A and 138 can used where the TIM frame is transmitted prior to the DTIM TBTT, but not as early as in FIG. 13A. The result is that the transmission of the DTIM beacon frame is postponed but by a factor less than that given in FIG. 13B. The transmission of other beacon frames is unaffected.

Like the example given in FIG. 13C, an arbitrary timing relative to the DTIM TBTT can be given for a TIM frame. The TIM frame time offset can be announced through an announcement element in a beacon frame and/or probe response, so that a station in standby mode is aware of when to wake up to receive the TIM frame. For example, the announcement element could comprise a fixed field indicating the number of microseconds after a DTIM TBTT that a TIM frame will be transmitted.

To further reduce the amount of time a station in standby needs to stay awake, it is desirable for a TIM frame to send at a higher PHY rate. However, a TIM frame should be sent at the lowest PHY rate so that even stations having the lowest quality connections can determine whether they have buffered data at the access point. To accommodate both of these conditions, two or more TIM frames can be transmitted at different rates. If a station is able to received a TIM frame at a higher data rate, the receive time can be reduced significantly. For example, just for the PHY header portion of the TIM frame, it would take 192 μs to transmit using the lowest PHY rate using DSSS, but it would only take 20 μs using a higher PHY rate using orthogonal frequency division multiplexing (OFDM). This is nearly an order of magnitude difference. Preferably, the TIM frames should be transmitted in order of data rate with the highest rates being transmitted first, so that if a station is unable to receive the higher rate TIM frame, it still has the opportunity to receive the one transmitted at a lower rate. For clarity, two different rate TIM frames are shown, but it is understood the approach can apply to more than two rates. For convenience, the TIM frame transmitted at the higher PHY rate will be referred to as the high rate TIM frame, and the TIM frame transmitted at the lower (or lowest) PHY rate will be referred to as the low rate TIM frame.

FIG. 14A illustrates one timing for transmission of two TIM frames at different PHY rates. The schedule of the TIM frame can employ a known offset relative to TBTT which can be negative. This offset can be predetermined or announced through an announcement element in a beacon frame or probe response. The offset may embody a negative or zero interval so that the timing can resemble that of FIGS. 12A and 12B or any interval in between. For clarity, a positive offset is illustrated.

Specifically, FIG. 14A shows high rate TIM frame 1404 being transmitted at time offset 1408 after TBTT, the TBTT after which beacon frame 1402 is transmitted. Immediately after an SIFS, low rate TIM frame 1406 is transmitted. A station capable of receiving a high rate TIM frame can wake up at time offset 1408 after the TBTT to receive high rate TIM frame 1404 and return to standby mode, if no buffered data is waiting at the access point. A station where the capability is uncertain can wake up at time offset 1408 after the TBTT to attempt to receive high rate TIM frame 1404. If the station is unable to receive high rate TIM frame 1404, it then receives low rate TIM frame 1406. If the station is not capable of receiving the high rate TIM frame, it can wake up at a time equal to an interval, which is the sum of time offset 1408, the minimum possible (or typical) transmission time of high rate TIM frame 1404, and an SIFS, after the TBTT; that is, it can wake up at the earliest possible time low rate TIM frame 1406 can be transmitted. Once the TIM frame is received at whatever rate the station is capable of, the station can return to standby mode if no buffered data is waiting at the access point. The stations incapable of receiving the high rate TIM frame may suffer a little penalty of having to remain awake a little longer to accommodate the inclusion of a high rate TIM frame. However, because the high rate TIM frame is transmitted at a high rate, the penalty will be generally small.

FIG. 14B shows a timeline where both a high rate TIM frame and a low rate TIM frame are individually scheduled. This timing eliminates the slight penalty mentioned above. Specifically, high rate TIM frame 1454 is transmitted at high rate time offset 1458 after TBTT, the TBTT after which beacon frame 1452 is transmitted. Low rate TIM frame 1456 is transmitted at basic time offset 1460 after the same TBTT. A station capable of receiving high rate TIM frame 1454 at high rate time offset 1458 after TBTT to receive the TIM frame, whereas a station incapable of receiving high rate TIM frame 1454 will instead wake up at basic time offset 1460 after TBTT to receive low rate TIM frame 1456. A station that is uncertain of its capability can first wake up to receive high rate TIM frame 1454 and wake up again to receive low rate TIM frame 1456, if it was unable to receive high rate TIM frame 1454.

One of ordinary skill in the art can appreciate that a combination of the methods shown in FIGS. 12A-C and 13A-B can be combined. The various permutations can be used. For example, the multiple TIM frames could occur only after DTIM TBTT, rather than every beacon interval or a hybrid timing where the high rate TIM frames occur only after DTIM TBTT, and low rate TIM frames occur after every TBTT, or vise versa. Furthermore, more than two rates could be employed as mentioned above.

The timing of FIG. 14A shows how multiple TIM frames transmitted at different rates can be sent as a burst. A burst can also be used to transmit multiple TIM frames at the same rate. As mentioned above with regard to FIG. 10, multiple TIMs comprising different bitmap control fields and partial virtual bitmap fields, can be used in place of a long TIM when the partial virtual bitmaps are long and sparse. Instead of creating a more complicated TIM element as illustrated in FIG. 10, multiple TIM frames containing a TIM element as illustrated in FIG. 9 are sent as a TIM frame burst.

Figure 15:
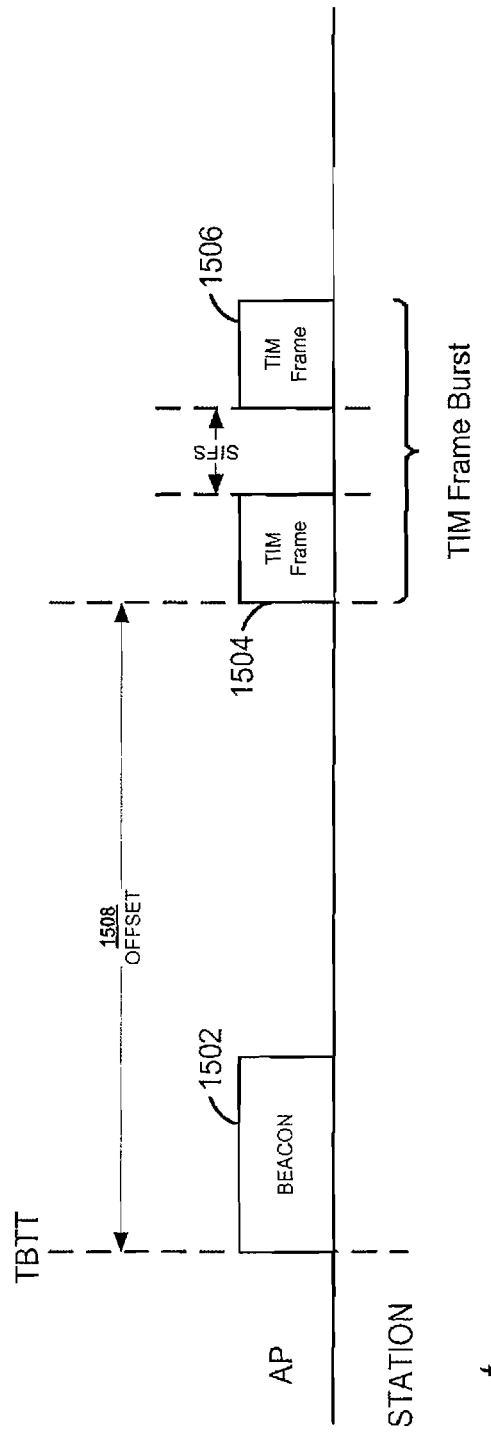
FIG. 15 shows multiple TIM frames sent as a burst.

Specifically, FIG. 15 shows multiple TIM frames sent as a burst. For clarity, a positive time offset relative to the TBTT is depicted, but a negative or zero offset can be used. A TIM frame burst is transmitted at time offset 1508 after TBTT, the TBTT after which beacon frame 1502 is transmitted. The TIM frame burst comprises TIM frame 1504 and 1506 which can contain different bitmap control fields and different partial virtual bitmap fields. The two TIM frames are separated by an SIFS. A station after receiving TIM frame 1504 can be aware that TIM frame 1506 is part of the current burst by using standard burst indications. For example, in 802.11, the frame control field, such as frame control field 802 in FIG. 8 and frame control field 1102 in FIG. 11, comprise a more data subfield which is set for all frames in a burst, except for the last frame. Of course, a station need not continue to receive TIM frames after it has received the TIM frame, which has an indication about the particular station's AID, that is, if the partial virtual bitmap has a bit allocated to represent the stations AID whether set or not, the station can then disregard all subsequent TIM frames in the burst.

Furthermore, it is understood that though the number of frames depicted is two, more than two frames can be present in the burst. The number of frames in the burst can vary from beacon interval to beacon interval depending on how sparse the TIM is at each beacon interval. This can be combined with the multiple rate TIM transmissions by transmitting TIM frame bursts at multiple rates. The bursts need not be transmitted every beacon interval and can be transmitted only at the DTIM beacon intervals.

As described in the background section, there may be information within a beacon frame that an associated station, even one in standby mode, needs to retrieve. For example, the beacon frame may contain a channel switch announcement, which indicates that the BSS will move to another channel shortly. In another example, the beacon frame may indicate that the access point changes the Enhanced Distributed Channel Access (EDCA) parameters. However, if a station in standby mode has to wake up to receive each beacon frame to receive potential changes in the beacon frame, having a separate TIM frame derives no benefit. The power savings derives from the station only receiving the much shorter TIM frame.

To address this potential difficulty, the TIM frame can also include a check beacon field. FIG. 16 illustrates a TIM control frame, which includes check beacon field 1608, which is a one octet fixed field. All remaining fields and elements are similar to their corresponding counterparts in FIG. 8. Check beacon field 1608 is indicative of whether a change in the beacon frame has occurred that is significant and warrants a station to read the following beacon frame, such as examples given above. Insignificant changes such as changes to the timestamp are not indicated by this field. Check beacon field 1608 could simply be a Boolean state which indicates whether the following beacon frame has changed significantly relative to the past beacon frame. However, if a station somehow missed the TIM frame indicating the change in the beacon, it may never become aware that a change has occurred. Another approach is that check beacon field 1608 is a counter which is incremented modulo 255 whenever a beacon frame has changed significantly relative to the past beacon frame. A station receiving a TIM frame compares (modulo 255) the value of check beacon field 1608 relative to the value of check beacon field in a previously received TIM frame. If the current value is greater (modulo 255) than the previous value, the station should receive the next beacon frame. Otherwise, the station need not stay awake for the next beacon frame and may elect to go into standby mode.

The changes in the beacon frame could be categorized as significant and critical where a significant but not critical change would not require the station to receive a beacon immediately but in the near future, and a significant and critical change would require the station to receive a beacon frame immediately. For example, a change in the EDCA parameters is significant, where failing to receive them affects quality of service. However, a channel switch announcement is critical, since failing to receive it would result in the station losing communications with the access point. In another embodiment, the eight bits of check beacon field 1608 could be divided into two counters, preferably a 3-bit critical change counter and a 5-bit significant change counter (presumably critical changes occur less frequently) or a 4-bit critical change counter and a 4-bit significant change counter. Alternatively, check beacon field 1608 could be expanded to two octets where each octet represents an 8-bit counter that are incremented for each critical change or each significant change respectively.

FIG. 17 illustrates the alternative embodiment of a TIM frame with a check beacon indication where the TIM frame is a management action frame. Check beacon field 1718 can take on any of the embodiments described for FIG. 16. The actions of the station upon receiving check beacon field 1718 is the same as above. All remaining fields and elements are similar to their corresponding counterparts in FIG. 11. The advantages and disadvantages of the use of a TIM management action frame over a TIM control frame are discussed above.

Figure 18:
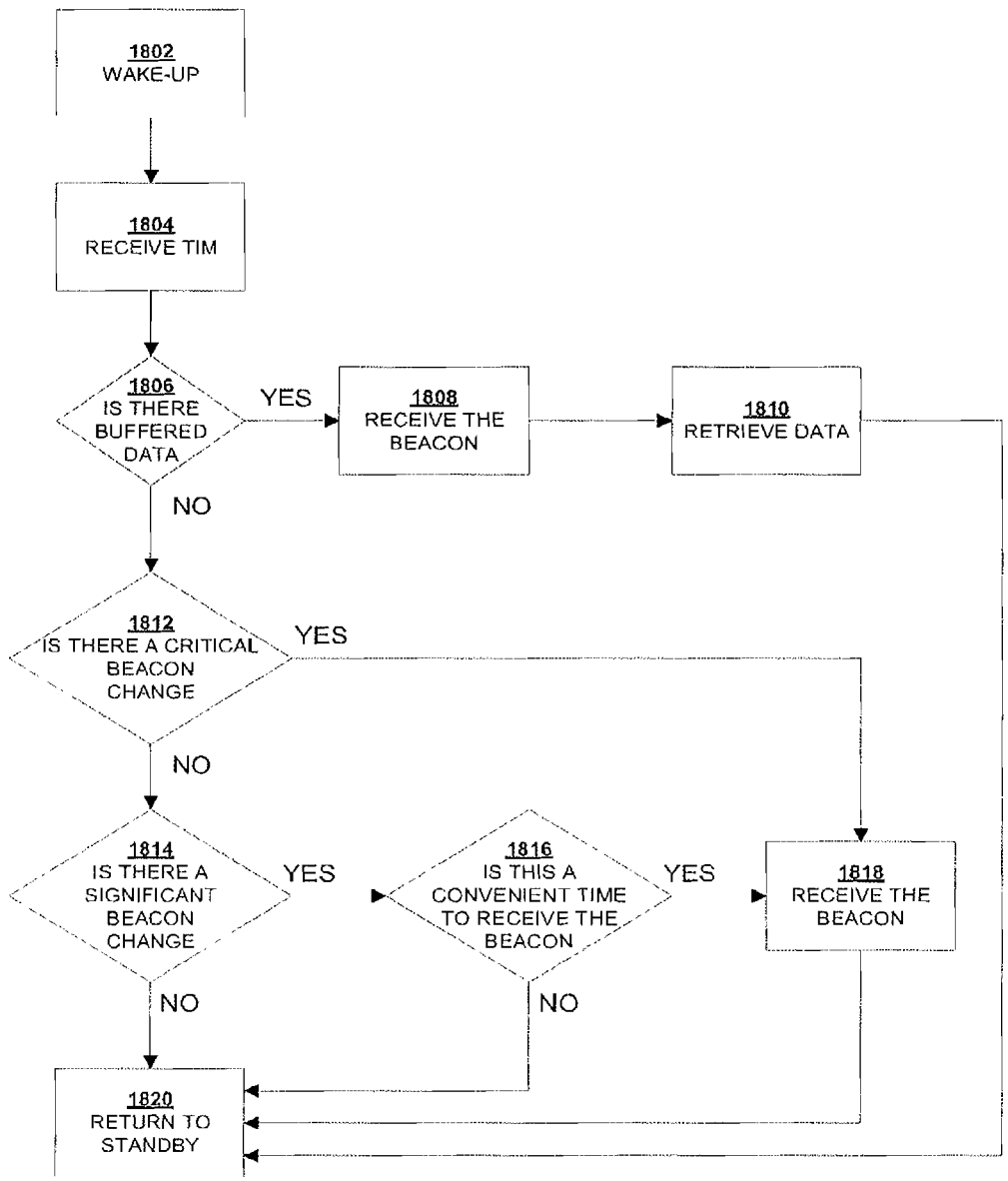
FIG. 18 is a flowchart showing exemplary logic which can be implemented in the software of a station showing the interoperation of the receiving of the TIM, the check beacon indication, and receiving of the beacon.

FIG. 18 is a flowchart showing exemplary logic which can be implemented in the software of a station showing the interoperation of the receiving of the TIM, the check beacon indication, and receiving of the beacon. At step 1802, the station wakes up. This should be the time set forth by one of the timing approaches previously discussed for the expectation of a TIM frame. At step 1804, the station receives the TIM frame. Based on the TIM frame, at step 1806, there is a determination made as to whether there is buffered data waiting at the access point. If there is buffered data the station may elect to remain awake and receive the next beacon frame. This is optional, but since the station may stay awake to retrieve the data, it may also receive the beacon frame. It may also decide to receive the beacon frame because a previous significant change has occurred, but the station elected not to receive the beacon at the time the change was detected. At step 1810, the station can retrieve the data by using a PS-Poll message sequence. At step 1820, the station can return to standby mode. On the other hand, if no buffered data is waiting for the station at the access point, as determined in step 1806, the station checks the check beacon indication for the occurrence of a critical beacon change at step 1812. If there is a critical beacon change, the next beacon frame is received at step 1818, and the station can return to standby mode at step 1820. If no critical beacon change has occurred, the station then can check the check beacon indication for the occurrence of a significant beacon change at step 1814. If there is no significant beacon change the station can return to standby without receiving the beacon at step 1820. If there is a significant beacon change, the station determines whether it should receive the beacon at step 1816. There are many possibilities for the determination at this step. For example, the station may only receive the beacon when there is buffered data, so it may defer receiving the beacon until such time the decision at step 1808 receives an affirmative decision. In other circumstances, the station may wait a certain period of time before requiring the beacon to be received or a combination of the previous two situations. In still another circumstance, the station does not recognize significant but not critical changes in the beacon, so it may never determine to receive the beacon at this step. If the decision is made not to receive the beacon, the station can return to standby at step 1820. Depending on the implementation, it may record that the beacon has had a significant change before returning to standby. If the determination at step 1816 is to receive the beacon, the station receives the next beacon frame at step 1818.

The flowchart is expressed in general with respect to the use of TIM frames. However, this can be used with the remainder of the partial beacon receiving approaches disclosed below. In particular, at step 1804, the first part of the beacon frame is received up to at least the point where the TIM element or ETIM element is received. At steps 1808 and 1818, the station receives the remainder of the beacon; otherwise, if the path flows from step 1814 to step 1820, the station can return to standby without receiving the remainder of the beacon.

While FIG. 6 illustrates the first 13 elements in a beacon frame in accordance with an exemplary wireless protocol. The order of these fields is suggested by the standard. However, only the first three fields are fixed fields and cannot be rearranged. The remaining fields are informational elements and can be identified by the element ID field within each element and therefore can be rearranged. A TIM element can be included near the beginning of the beacon frame so that a station in standby mode need only wake up to receive part of the beacon frame to determine whether the access point has buffered data waiting for it. Since all informational elements are identified by the element ID field within each element, including the TIM element after the three fixed fields, the beacon frame should be interoperable with legacy systems.

Moving the TIM element after the three fixed fields would enable a station in standby mode to receive only part of the beacon frame; however, the same issue applies as discussed above that in certain circumstances a station in standby mode should receive the entire beacon. A check beacon informational element can be included in the beacon frame to indicate when significant changes to the beacon frame occur.

FIG. 19 illustrates the first portion of a beacon frame in accordance to one embodiment of the invention. Fields 1902, 1904, 1906, 1908, 1910, and 1912 are part of the standard MAC header, similar to that described for FIG. 11 This is followed by timestamp field 1914, beacon interval field 1916, and capability information field 1918, the three required fixed fields in a beacon. Timestamp field 1914 is an eight octet fixed field comprising the time the present frame is sent. Beacon interval field 1916 represents the number of time units between TBTTs. Capability information field 1918 contains a number of subfields that are used to indicate requested or advertised capabilities. Following the three fixed fields, the beacon includes check beacon informational element 1920, which is described in further detail below, and TIM element 1922 which is the standard TIM element as describe above in FIG. 7. Equivalently, TIM element 1922 could precede check beacon informational element 1920.

FIG. 20 illustrates an exemplary embodiment of the check beacon informational element. The exemplary check beacon information element comprises two octet element ID fixed field 2002 and two octet length field 2004 which are standard in any informational element. Element ID field 2002 contains a new information element identifier that is associated with the check beacon informational element. It also comprises check beacon field 2006 which is indicative of significant and/or critical change in the beacon. The manner of indication could embody any of the variations described for FIG. 16.

Using an embodiment of the check beacon field that is one octet and the smallest possible TIM element size, the portion of the beacon that must be read to determine whether the access point has buffered data waiting is 45 octets. At 1 Mb/s direct sequence spread spectrum rate, receiving this portion of the beacon frame takes 552 µs, which is considerably shorter that the typical 2 ms a complete beacon frame would currently take to receive. The fact that a station need only be awake a fraction of the time to determine whether the access point has buffered data waiting can conserve power in the station.

One difficulty in ignoring the remainder of the beacon frame is that the last field in any frame is the frame check sequence (FCS) which is used to determine the integrity of the received frame. Without receiving the FCS, the station cannot be sure whether the received portion is correct. If the TIM element is corrupted, the consequences are slight. An error could cause the station to wake up and poll for buffered data when there is none, in which case the station will discover there is no data and return to standby. Alternatively, an error could cause the station to stay dormant when the access point has buffered data waiting, in which case delivery will be delayed until the next beacon frame. The latter case would occur without a partial beacon frame reception. Had the station received the entire beacon, it would have discarded the beacon frame because the FCS would have indicated the beacon frame was corrupt.

In the event the check beacon field is corrupt, the receiver might read the entire beacon frame when it didn't need to. If the station is configured to read the entire beacon if the value in the check beacon field differs from that received in the previous frame, rather than simply greater than received in the previous frame, the chance of a corrupt check beacon field causing a partial reception of the beacon frame when a full reception is warranted diminishes. Despite the consequences being slight, if the check beacon field is corrupted frequently, such as when the conditional error rate in the TIM and check beacon element increase, the power consumption would increase due to the station having to unnecessarily wake up. The addition of a partial frame check information element could eliminate these issues.

FIG. 21 illustrates a partial frame check informational element exemplary embodiment. As with all information elements, element ID field 2102 and length field 2104 are present and similar to that described above for other elements. Element ID field 2102 contains a new information element identifier that is associated with the partial frame check informational element. The partial frame check informational element would also comprise a partial frame FCS which could simply be the CRC or even a 1-bit parity check of the check beacon information element and the TIM element. It could also include the timestamp field, the beacon interval field and the capability information field. Fields in the MAC header do not need to be considered otherwise the frame would not be recognized as a valid beacon frame. The partial frame check information element could be inserted into the beacon right after TIM element 1922.

Rather than create two new informational elements, the three informational elements could be combined into an ETIM element. FIG. 22 shows an exemplary first portion of the beacon frame using ETIM element. Fields 2202, 2204, 2206, 2208, 2210, 2212, 2214, 2216 and 2218 are similar to their counterparts, fields 1902, 1904, 1906, 1908, 1910, 1912, 1914, 1916 and 1918, respectively, as described above for FIG. 19. Rather than including a TIM element along with a check beacon informational element and potentially a partial frame check element, ETIM element 2220 is included.

FIG. 23 shows the format of an ETIM informational element. As with all informational elements, element ID field 2302 and length field 2304 are present and similar to that described above for other elements. Element ID field 2302 contains a new informational element that is associated with ETIM informational elements. Check beacon field 2306 is a one octet field indicative of whether the beacon frame contains significant and/or critical changes. The manner of indication could embody any of the variations described for FIG. 16. Bitmap control field 2308 is similar to field 710 that is described in FIG. 7. Partial virtual bitmap field 2310 is similar to field 712 that is described in FIG. 7. Collectively, bitmap control field 2308 and partial virtual bitmap field 2310 are referred to as TIM fields. Finally, error detection field 2312 provides some sort of integrity check of check beacon field 2306 and the TIM fields such as a 1-bit parity check or a more complex CRC of multiple bits. Other fields in a TIM informational element such as the DTIM count field and the DTIM interval field could be present in the TIM fields but are not required.

For similar reasons as explained for FIGS. 13A and 13B, the ETIM informational element need not be included in every beacon. They may, for example, only be included in DTIM beacons. In this manner, a station in standby mode need only wake up during DTIM beacons to determine if the access point has buffered data waiting. The ETIM informational element could alternatively be provided at ETIM interval that is every n beacons where n is the ETIM interval. This could be negotiated through a startup mechanism. The ETIM interval could also be announced by the access point in a beacon frame or a probe response.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A method for retrieving buffered data from an access point, the method comprising:

waking up from a standby mode at a predetermined time relative to a delivery traffic indication map (DTIM) target beacon transmission time (TBTT);

receiving, after the waking up, a traffic indication map (TIM) frame not disposed within a beacon frame at the predetermined time;

retrieving the buffered data in response to an indication by a partial virtual bitmap within the TIM frame;

re-entering the standby mode after the retrieving;

wherein the TIM frame is received prior to a DTIM beacon frame.

2. The method of claim 1, wherein the TIM frame is one of a control frame and a management action frame.

3. The method of claim 1, wherein the predetermined time is determined according to one of a previous beacon frame and a probe response.

4. The method of claim 1, wherein the predetermined time precedes the DTIM TBTT by an estimated length of the TIM frame plus a short interframe space (SIFS).

5. The method of claim 4, wherein the estimated length of the TIM frame is equal to a minimum, an average or a maximum size of the TIM frame.

6. The method of claim 1, wherein the TIM frame further comprises a check beacon field for indicating a critical or significant change in a subsequent beacon frame.

7. The method of claim 6, further comprising waking up after re-entering the standby mode to receive a subsequent beacon frame if the check beacon field indicates the critical or the significant change in the subsequent beacon frame.

8. The method of claim 1, wherein the TIM frame is received prior to only the DTIM beacon frame and not prior to other beacon frames.

9. A wireless device for retrieving buffered data from an access point, the wireless device comprising:
a processor;
a memory comprising instructions causing the processor to:
wake up from a standby mode at a predetermined time relative to a delivery traffic indication map (DTIM) target beacon transmission time (TBTT);
receive, after the wake up, a traffic indication map (TIM) frame not disposed within a beacon frame at the predetermined time;
retrieve the buffered data in response to an indication by a partial virtual bitmap within the TIM frame;
re-enter the standby mode after retrieving the buffered data;
wherein the TIM frame is received prior to a DTIM beacon frame.

10. The wireless device of claim 9, wherein the TIM frame is one of a control frame and a management action frame.

11. The wireless device of claim 9, wherein the predetermined time is determined according to one of a previous beacon frame and a probe response.

12. The wireless device of claim 9, wherein the predetermined time precedes the DTIM TBTT by an estimated length of the TIM frame plus a short interframe space (SIFS).

13. The wireless device of claim 12, wherein the estimated length of the TIM frame is equal to a minimum, an average or a maximum size of the TIM frame.

14. The wireless device of claim 9, wherein the TIM frame further comprises a check beacon field for indicating a critical or significant change in a subsequent beacon frame.

15. The wireless device of claim 14, wherein the instructions cause the processor to wake up after re-entering the standby mode to receive a subsequent beacon frame if the check beacon field indicates the critical or the significant change in the subsequent beacon frame.

16. The wireless device of claim 9, wherein the TIM frame is received prior to only the DTIM beacon frame and not prior to other beacon frames.

17. An access point comprising:
a processor;
a wireless network interface device;
a memory comprising instructions causing the processor to:
cause the wireless network interface device to transmit a traffic indication map (TIM) frame at a predetermined time relative to a delivery TIM (DTIM) target beacon transmission time (TBTT);
wherein the TIM frame is:
not disposed within a beacon frame; and
received prior to a DTIM beacon frame.

18. The access point of claim 17, wherein the TIM frame is one of a control frame and a management action frame.

19. The access point of claim 17, wherein the TIM frame comprises one or more partial virtual bitmap fields indicative of the access point having buffered data awaiting transmission to one or more wireless devices.

20. The access point of claim 17, wherein the predetermined time precedes the DTIM TBTT by an estimated length of the TIM frame plus a short interframe space (SIFS).

21. The access point of claim 20, wherein the estimated length of the TIM frame is equal to a minimum, an average or a maximum size of the TIM frame.

22. The access point of claim 17, wherein the TIM frame further comprises a check beacon field for indicating a critical or significant change in a subsequent beacon frame.

23. The access point of claim 20, wherein the TIM frame is received prior to only the DTIM beacon frame and not prior to other beacon frames.

* * * * *